(12) United States Patent
Roibier

(10) Patent No.: US 7,025,009 B2
(45) Date of Patent: Apr. 11, 2006

(54) ELEMENT OF AN AGRICULTURAL MACHINE COMPRISING AN ADJUSTABLE BALLASTING DEVICE

(75) Inventor: Thierry Roibier, Nangis (FR)

(73) Assignee: Kuhn-Nodet S.A., Montereau (FR)

( * ) Notice: Subject to any disclaimer, the term of this patent is extended or adjusted under 35 U.S.C. 154(b) by 0 days.

(21) Appl. No.: 10/851,174

(22) Filed: May 24, 2004

(65) Prior Publication Data
US 2004/0256122 A1   Dec. 23, 2004

(30) Foreign Application Priority Data
Jun. 3, 2003   (FR)   ................... 03 06695

(51) Int. Cl.
*A01C 5/00*   (2006.01)
*A01C 7/18*   (2006.01)
(52) U.S. Cl. .................. 111/62; 172/624.5; 172/572
(58) Field of Classification Search ............ 111/62, 111/66, 67, 927, 624, 624.5, 61; 172/624.5, 172/572
See application file for complete search history.

(56) References Cited

U.S. PATENT DOCUMENTS

| | | | |
|---|---|---|---|
| 2,698,114 A * | 12/1954 | Buhr | ..................... 222/624 |
| 4,382,573 A * | 5/1983 | Aondetto | ..................... 248/561 |
| 4,744,316 A | 5/1988 | Lienemann et al. | |
| 4,766,962 A | 8/1988 | Frase | |
| 5,163,518 A | 11/1992 | Foley | |
| 5,461,995 A * | 10/1995 | Winterton | ..................... 111/139 |
| 5,529,128 A * | 6/1996 | Peterson et al. | ............ 172/145 |
| 5,555,824 A * | 9/1996 | Stufflebeam et al. | .......... 111/62 |
| 5,601,147 A * | 2/1997 | Lowe et al. | ............. 172/624.5 |
| 6,068,061 A * | 5/2000 | Smith et al. | ................ 172/139 |

FOREIGN PATENT DOCUMENTS

EP   0 155 692   9/1985

* cited by examiner

Primary Examiner—Árpád Fábián Kovács
(74) Attorney, Agent, or Firm—Oblon, Spivak, McClelland, Maier & Neustadt, P.C.

(57) ABSTRACT

A working element of an agricultural machine mounted on a substantially horizontal beam by a linking structure comprising at least one upper arm and at least one lower arm, the working element being subjected on one hand to a depth control force directed toward the ground and on another hand to a ballasting exerted by a ballasting device comprising at least one spring.

The ballasting device consists of a handle and at least one rack, the handle comprising at least one rod intended to collaborate with the rack.

13 Claims, 5 Drawing Sheets

ELEMENT OF AN AGRICULTURAL MACHINE COMPRISING AN ADJUSTABLE BALLASTING DEVICE

BACKGROUND OF THE INVENTION

1. Field of the Invention

The present invention relates to the general technical field of agricultural machinery. It relates more particularly to a working element of an agricultural machine intended to be mounted on a substantially horizontal beam by means of a linking structure comprising at least one upper arm and at least one lower arm, said working element being subjected on one hand to a depth control force directed toward the ground and on another hand to a ballasting exerted by a ballasting device comprising at least one spring.

The invention also concerns agricultural apparatuses fitted with a working element according to the invention. It relates also to an agricultural seed drill fitted with one or more working elements as described above.

2. Discussion of the Background

This type of working element is known in U.S. Pat. No. 5,555,824. This document relates to a precision seed drill comprising several of these working elements. The working elements are provided with disks making it possible to form furrows in the ground into which the seeds will be inserted. The working elements are connected to the frame of the seed drill by means of a respective linking structure which is mounted on a beam. The linking structure comprises two lower arms and two upper arms.

The disks are subject to the weight of the working element which carries them to ensure that the furrow is formed to a required depth. Additionally, each working element is loaded with a ballasting device to facilitate the insertion of the disk into the ground. The ballasting of the working element is performed by means of springs connected between the upper arms and the lower arms. The springs are in particular connected to a support provided with two locking levers. The position of the support can be adjusted by means of different holes made in the upper arms to change the ballasting. The support also comprises, in its central part, a handle used to modify the ballasting according to a fine and continuous adjustment.

The ballasting of the working elements is modified individually and by moving the support from one hole to a different hole. Accordingly, the support guided on either side by the upper arms, slides over the latter until the required adjustment is obtained. Next the two levers must be engaged in a respective hole. Since the support has a width equal to the distance between said upper arms and comprises on either side surfaces for guidance, the user has to feel to engage the two locking levers in the required holes because visibility is not sufficient.

In addition, to obtain a uniform germination of the seeds, each working element mounted on the seed drill beam must be loaded in the same manner. This is not easily done partly because on each working element is mounted a hopper containing seeds which empties gradually as the seed drill advances and partly because of the use of the fine adjustment of the handle placed on the support. It is therefore not obvious to ballast the various working elements in the same manner.

SUMMARY OF THE INVENTION

The object of the present invention is to remedy the aforementioned drawbacks. In particular it will propose an economical ballasting device which users will find simple and fast to adjust and easy to use. Furthermore, the ballasting device must be able to ballast the working element sufficiently to use it in hard and/or unworked ground.

Accordingly, an important feature of the invention consists in that said ballasting device consists of a handle and at least one rack, said handle comprising at least one rod intended to collaborate with said rack.

In this manner, the user can simply and rapidly adjust the setting of the ballasting on a working element. This adjustment is made without effort for the user and offers better visibility for access to the various possible adjustments of the rack.

BRIEF DESCRIPTION OF THE DRAWINGS

Other features of the invention, to be considered separately or in all their possible combinations, will emerge from the following description of a nonlimiting embodiment of the invention represented in the appended drawings wherein.

DESCRIPTION OF THE PREFERRED EMBODIMENT

Figure 1:
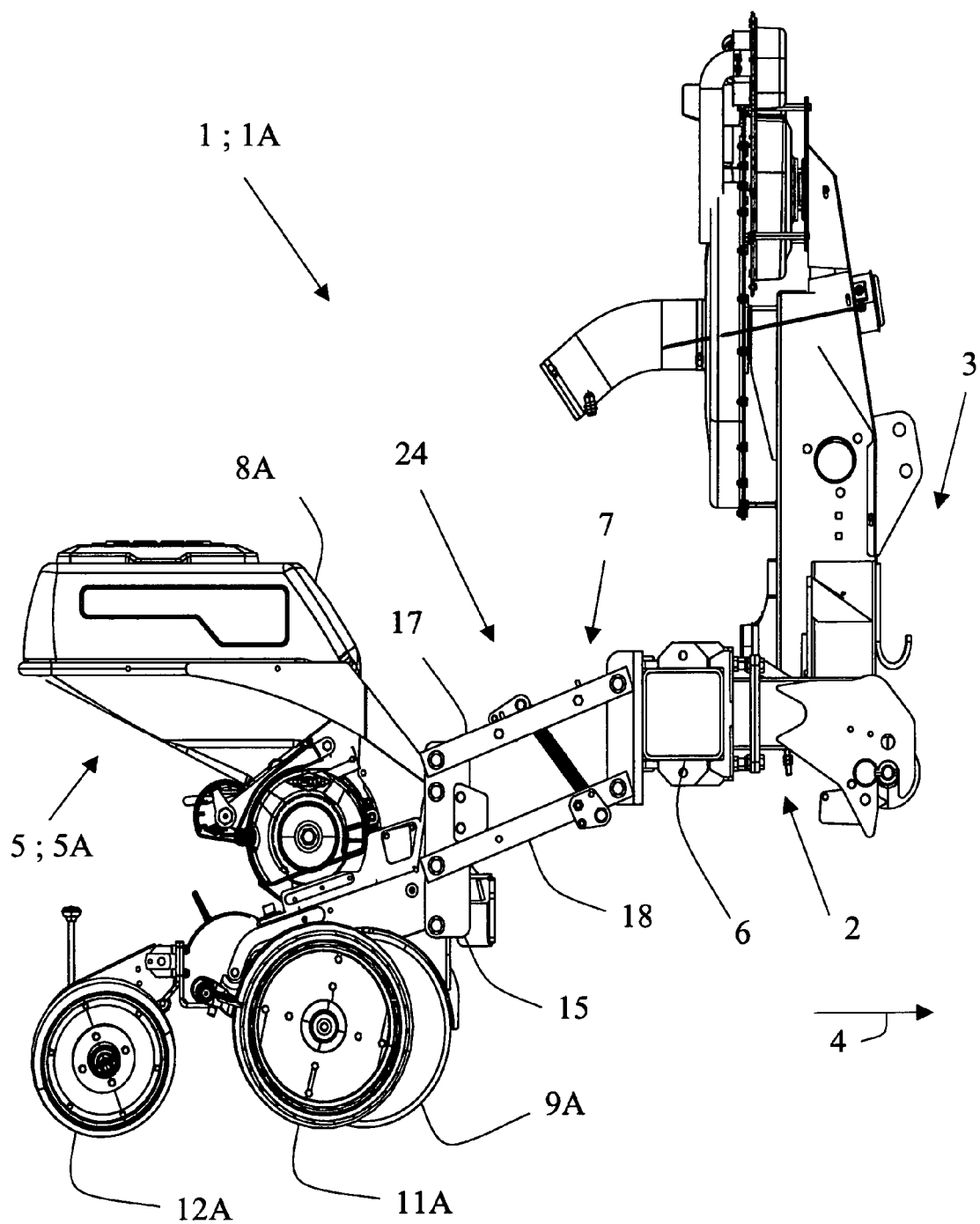
FIG. 1 represents a simplified lateral view, in the raised position, of a precision seed drill according to the invention.

As shown in FIG. 1, the agricultural machine 1 is coupled to the rear hitch of a tractor (not depicted) and thus comprises a frame 2 provided with a standard hitch 3 for connection to said tractor. During work, this machine 1 is displaced, in a forward direction and a way indicated by the arrow 4, over the ground to be worked. This frame 2 comprises amongst other things several working elements 5 and a beam 6 arranged substantially horizontally and transverse to the direction of travel 4. The latter is supported by wheels (not depicted) resting on the ground.

In the rest of the description, the concepts of "front" and "rear", "in front of" and "behind" are defined in relation to the direction of travel 4 and the concepts of "right" and "left" are defined when looking at said agricultural machine 1 from the rear in said direction of travel 4.

The agricultural machine 1 represented in FIG. 1 corresponds to a seed drill of the precision type 1A. This seed drill 1A sows each of the seeds individually in well determined rows. The seed drill 1A is also commonly called a working element seed drill. The different working elements 5 are attached at regular intervals onto said beam 6 by means of a respective linking structure 7. Said beam 6 is preferably hollow and of square section. In the embodiment in FIG. 1, this being a precision seed drill 1A, the working elements 5 according to the invention are sowing elements 5A. For such seed drills 1A, it is normal to have seed drills comprising two to twelve or even more sowing working elements 5A arranged regularly along the beam 6. Each of them comprises a hopper 8A containing the seeds, disks 9A and a spout (not depicted). The hopper 8A comprises at its base a seed distribution system. This communicates directly with the spout which places the seed in the furrow formed by said disks 9A. The sowing working element 5A also comprises a lateral gauge wheel 11A to control the sowing depth. At the front, the sowing working element 5A may be fitted with a trash remover device (not depicted) and at the rear with a press device 12A for pressing the seed into the furrow.

In the rest of the description, the working element 5 of the invention will be considered to be a device comprising any tool intended to make contact with the ground in the working configuration of the agricultural machine 1.

Figure 2:
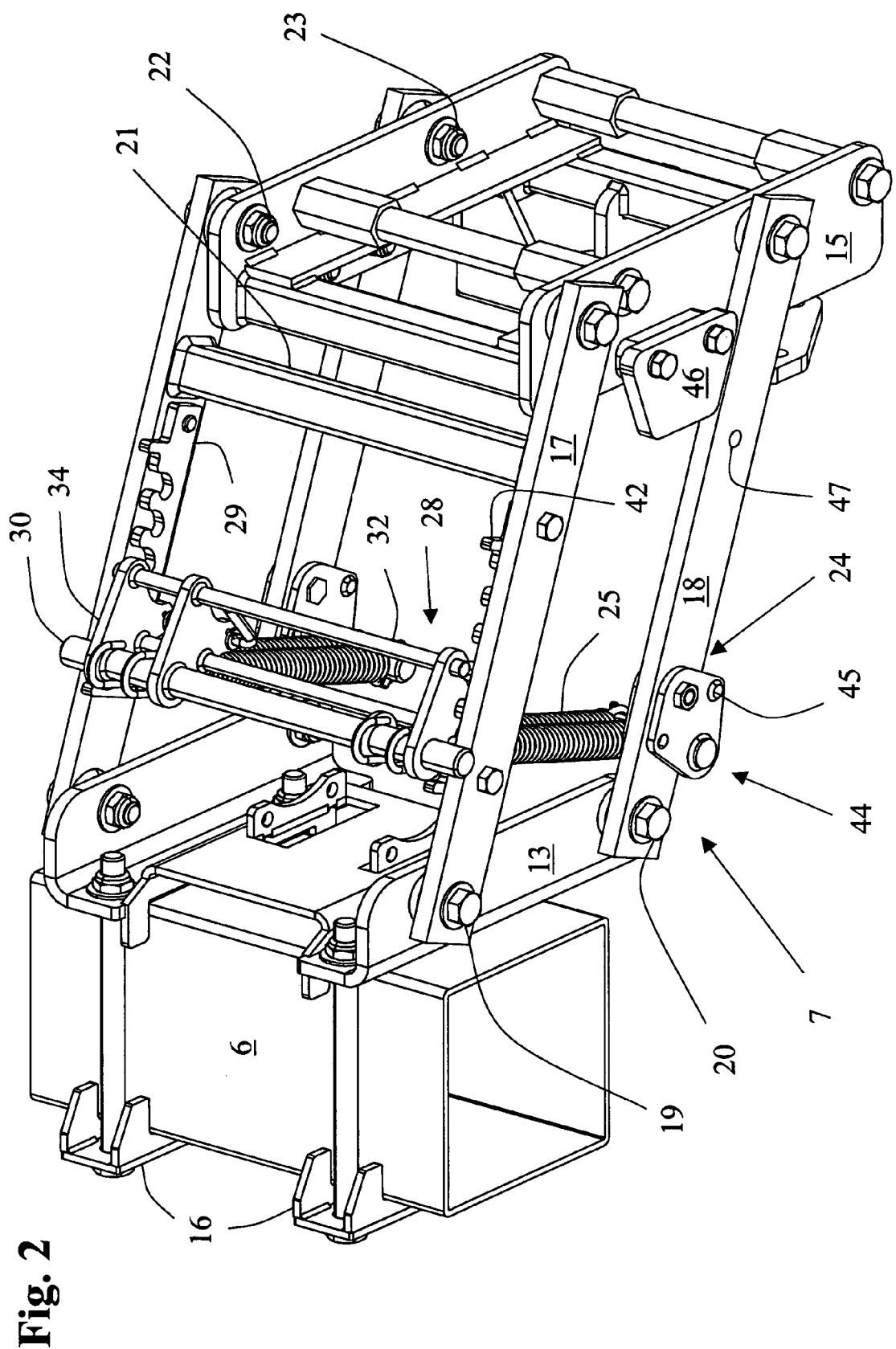
FIG. 2 represents a view in perspective of a working element according to the invention in a first position.

In the embodiment represented in FIGS. 1 and 2, the working element 5 is attached to said hollow beam 6 by means of said linking structure 7. The latter comprises a clamp 13 and an interface 15. The clamp 13 allows the attachment of the linking structure 7 to said beam 6 in combination with two flanges 16 and several screws. This assembly allows in particular to modify the position and the inter-row spacing of the working elements 5 on the beam 6 to suit them to different types of work.

As shown in the figures, the linking structure 7 further comprises at least one upper arm 17 and at least one lower arm 18. Each upper arm 17 is connected either on one side or on the other side of the clamp 13 by means of a first respective articulation 19 of substantially horizontal axis and transverse to the direction of travel 4. Each lower arm 18 is attached in the same manner on either side of the clamp 13 by means of a second respective articulation 20 of substantially horizontal axis and transverse to the direction of travel. Said arms 17, 18 are arranged in the direction of travel 4 and are advantageously parallel with one another. The upper arms 17 are further connected together by a linking tube 21 making it possible to maintain a constant spacing between said upper arms 17. The rear end of said arms 17, 18 is, for its part, connected to the interface 15 by means of a third and a fourth respective articulation 22, 23 of substantially horizontal and transverse axis. Said clamp 13 with an upper arm 17, a lower arm 18 and the interface 15 advantageously defines a parallelogram. Said linking tube 21 joining the two upper arms 17 is also used to give rigidity to the linking structure 7. The interface 15 is a support used to receive the working element 5 and various optional equipments.

Figure 3:
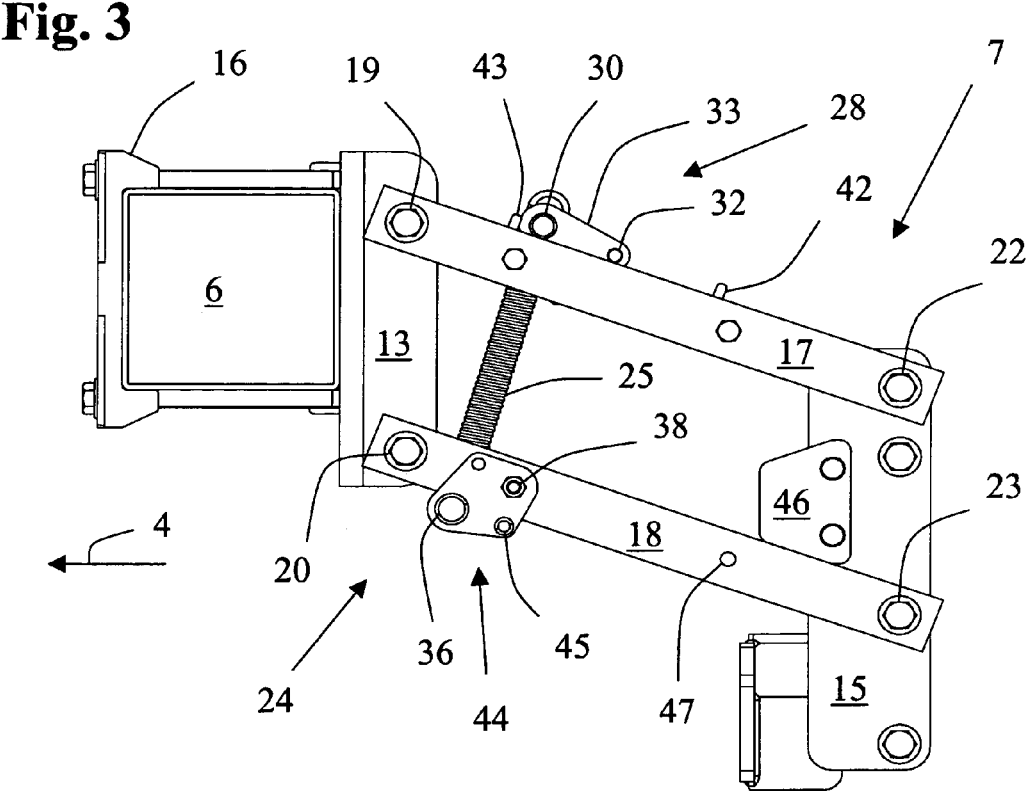
FIG. 3 represents a side view according to FIG. 2.

Thanks to this linking structure 7 in parallelogram form as shown in FIG. 3, the working element 5 is free to move up and down and may faithfully follow the unevennesses of the ground. To ensure an even depth of work, the working element 5 is provided with a gauge wheel 11 resting on the ground. In the working phase, the tool that is attached to the working element 5 has a natural tendency to enter the ground because it is subjected to a force directed toward the ground resulting from the weight of the working element 5 also called the depth control pressure.

On one hand it is normal on this type of machine 1 for the working element 5 to be subjected to a depth control pressure improving the action of the tools in contact with the ground. On another hand, to further increase the action of the tool, connected to the working element 5, in relation to the ground, it is known to ballast the working element 5. Accordingly, the working element 5 comprises a ballasting device 24 consisting of several draw-springs 25 with contiguous coils. Said springs 25 are arranged between the upper arm 17 and the respective lower arm 18 of the linking structure 7. Each spring comprises an upper anchor point and a lower anchor point. Said upper anchor point 26 is connected to the upper arm 17 while said lower anchor point 27 is connected to the lower arm 18. Ballasting makes it possible, in addition to the depth control pressure, to add weight to the working element 5 in order to work in more difficult conditions, for example, to use a conventional seed drill to carry out simplified sowing or even direct sowing. Since the ground is harder, the weight of the sowing element alone does not allow the tool to enter the ground to reach the required depth.

In practice, it is interesting to be able either to increase, or decrease the ballasting, that is to say to increase or decrease the weight to be applied to the working element 5 to suit the different ground conditions and structures. In the embodiment shown and as an important feature, the ballasting device 24 comprises a handle 28 associated with at least one rack 29.

Figure 5:
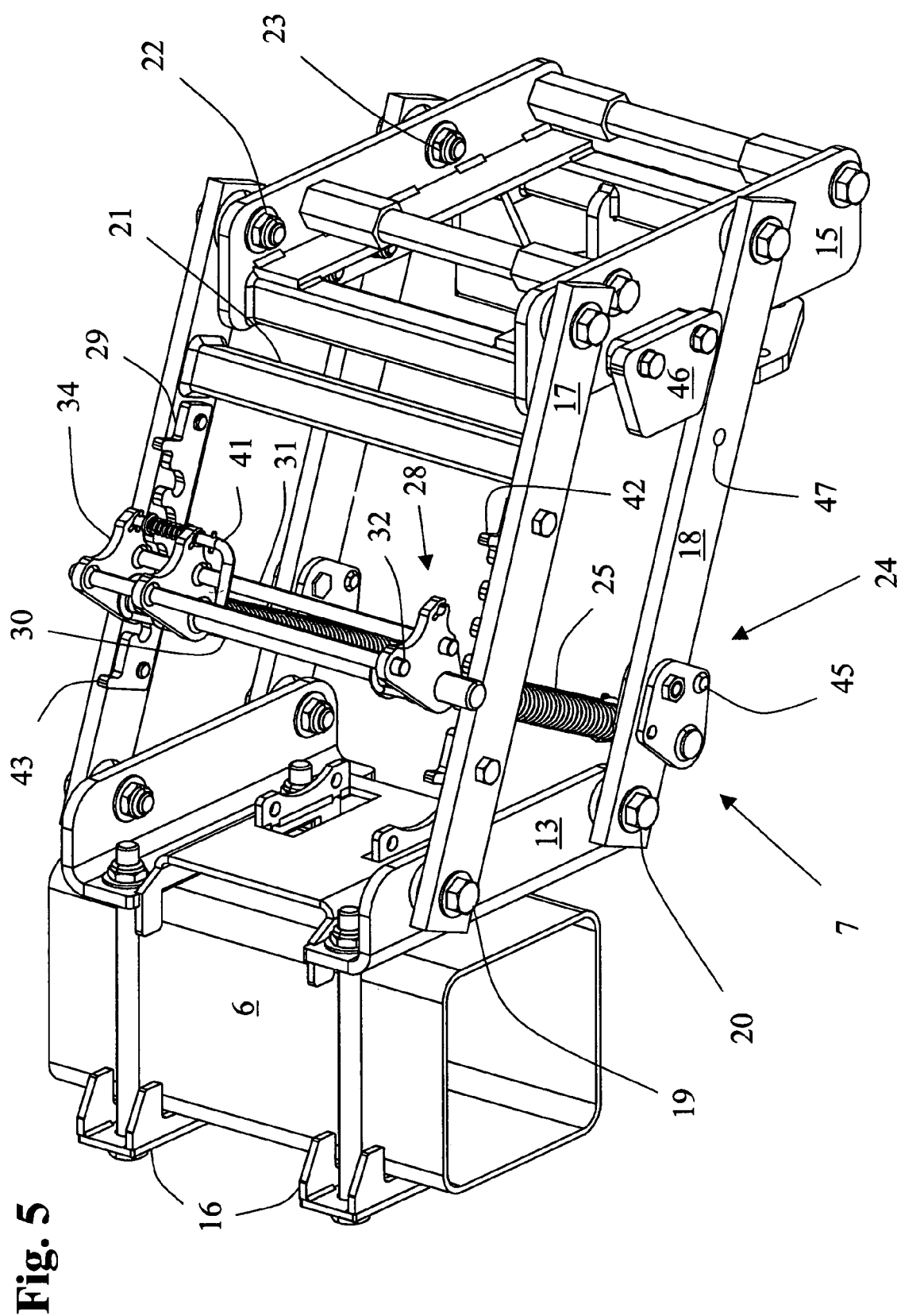
FIG. 5 represents a view in perspective of a working element according to the invention in a transfer position.
Figure 6:
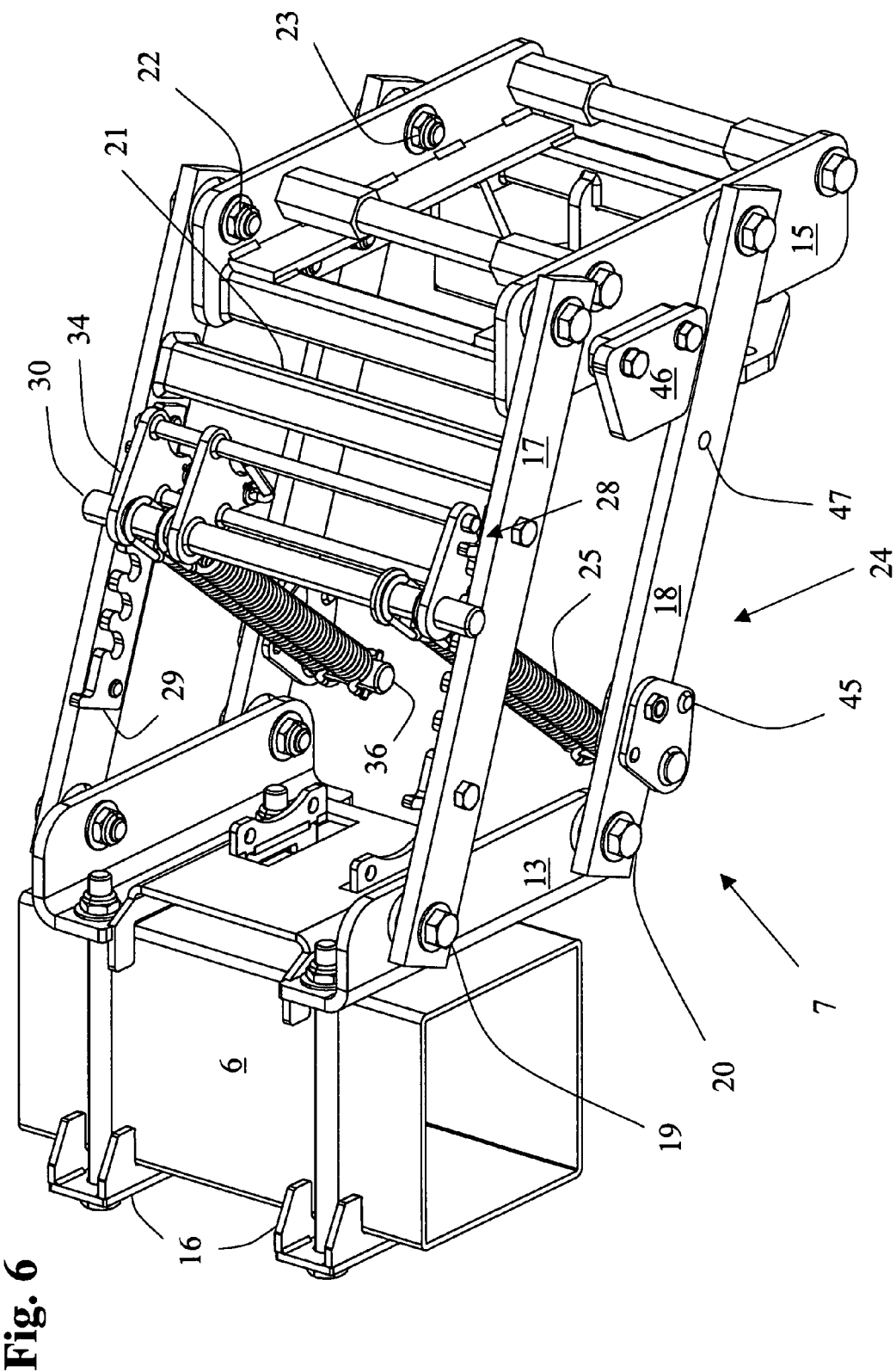
FIG. 6 represents a view in perspective of a working element according to the invention in a second position.

In the light of FIGS. 2, 5 and 6, the handle 28 consists of a first rod 30, a second rod 31 and a third rod 32. The three rods 30, 31, 32 are placed horizontally and perpendicular to the direction of travel 4. These three rods 30, 31, 32 are connected to one another by plates 33, 34, 35 into which they are slid. Said plates 33, 34, 35 are substantially triangular in shape. The left and right plates 33, 34 are attached substantially to the ends of said rods 30, 31, 32 while the intermediate plate 35 is placed at a certain distance from said right plate 34 toward the interior of the linking structure 7. At least two of said rods 30, 31, 32 are advantageously arranged close to one apex of the triangle. The first rod 30 rests on the upper arms 17 while the second rod 31 and the third rod 32 are arranged advantageously between said upper arms 17.

According to another important feature of the present invention, the handle 28 pivots about the first rod 30 to modify the ballasting of the working element 5. The first rod 30 being supported by said upper arms 17, it slides over said upper arms 17. Preferentially, the first rod 30 has a greater diameter and greater length than the two other rods 31, 32. The second rod 31 and the third rod 32 are, for their part, identical in length and have a similar diameter.

Figure 4:
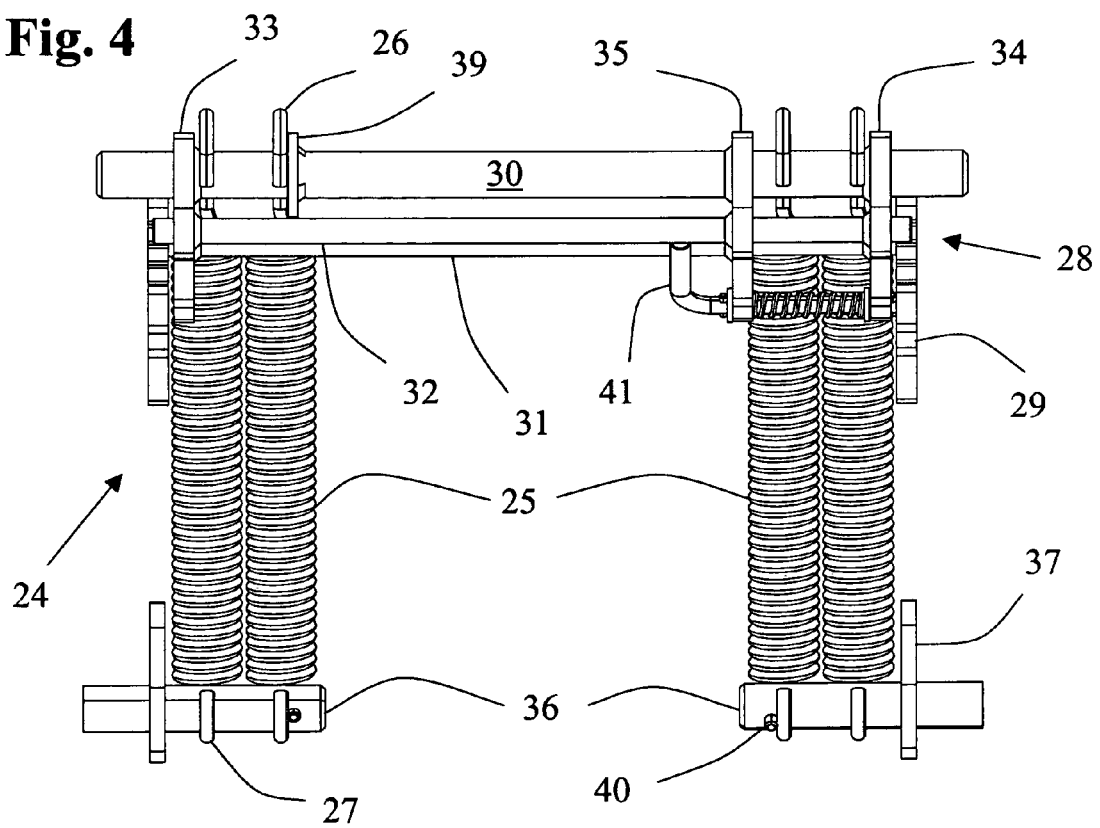
FIG. 4 represents a view on another scale of the ballasting device according to FIG. 2.

According to the exemplary embodiment of the ballasting device 24 represented in FIG. 4, the springs 25 are advantageously mounted in pairs. Said springs 25 are strictly identical. A group of springs 25 is mounted somewhat in the vicinity of the left upper arm 17 and another group of springs 25 is mounted in the vicinity of the right upper arm 17. The upper anchor point 26 of each spring 25 is advantageously connected to the first rod 30 and the lower anchor point 27 is advantageously connected to a lower tube 36. Said lower tube 36 advantageously has a diameter identical to said first rod 30. The lower tube 36 is connected to said respective lower arm 18 by means of two yokes 37. Said yokes 37 are connected to said respective lower arm 18 by any known means. In the embodiment shown, the known linking means is a bolt 38. Preferentially, the lower tube 36 is in two portions, one is connected to the left lower arm 18 and the other is connected to the right lower arm 18. The diameter of the lower tube 36 and of the first tube 30 is matched to the diameter of the upper anchor point 26 and of the lower anchor point 27 of the spring 25.

In a manner known to those skilled in the art, when a working element 5 is more or less ballasted by the action of said springs 25, the position of said springs 25 is more or less inclined toward the rear in relation to the direction of travel 4. The lower anchor point 27 is then arranged in the close vicinity of the beam 6 while the upper anchor point 26 tends rather to get closer to the working element 5.

According to FIG. 4, the upper anchor point 26 of the left springs 25 is mounted between the left plate 33 and a stopping element made in the form of a washer 39 serving as a retainer while the upper anchor point 26 of the right springs 25 is mounted between the right plate 34 and the intermediate plate 35. The lower anchor point 27 of the two groups of springs 25 is retained on one hand between a yoke 37 and on another hand another stopping element made in the form of a pin 40. The lower tube 36 being made in two parts, the lower anchor point 27 of each spring 25 can be easily slid around said lower tube 36 and then, in groups of two, be immobilized by said pin 40.

According to the figures, each upper arm 17 is provided with a respective rack 29. Each rack 29 is attached to the inner portion of the upper arm 17 using any known means. The racks 29 are provided with notches producing various adjustments for the ballasting of a working element 5. Said handle 28 is engaged in said notches of said racks 29 by means of said second rod 31. Each rack 29 preferably comprises five adjustment notches. The length of the second rod 31 is substantially equal to the space between said upper arms 17. Said left and right plates 33, 34 are disposed in the vicinity of said racks 29. FIG. 2 shows the ballasting device 24 in its first position. In this forward position, the ballasting of the working element 5 is rather weak, even almost zero. The ballasting device 24 shown in FIG. 6 is in its last position. In this backward position of the ballasting device 24, the load on the working element 5 is maximal.

In the working configuration, the handle 28 is retained in one of said notches of the rack 29 thanks to the engagement of said second rod 31 in one of said notches. To prevent the second rod 31 from coming out of said notch when running over an obstacle in work, said handle 28 comprises, in addition, a locking lever 41. Said locking lever 41 immobilizes the handle 28 in the desired position. It is advantageously housed in the intermediate plate 35 and in the right plate 34. In the locked position, the lever 41 is in contact with the underside of the rack 29. This locking lever 41 passes through one of the apexes of the triangle, the one which is still free, of the intermediate plate 35 and the right plate 34. Preferentially, the second rod 31 thus rather passes through one side of said plates 33, 34, 35 and is advantageously arranged between the first rod 30 and the locking lever 41. The shape of the notches is designed to immobilize the second rod 31 in work and prevent all stress on the locking lever 41. The use of such a locking lever 41 is known to those skilled in the art. The locking lever 41 shown in FIG. 4 is in its locked position. The portion of the locking lever 41 between the right plate 34 and the intermediate plate 35 is provided with a spring system used to retain said handle 28 in the chosen position.

FIG. 5 shows the handle 28 in a transfer position. This transfer position allows the user to modify the ballasting of the working element 5. It is essential that the working element 5 does not rest on the ground when the user wants to modify the ballasting. Thus, the rear hitch of the tractor and the beam 6 are raised so that the working elements 5 are in their low position as shown in FIG. 5. In this low position, the upper arms 17 are closest to the lower arms 18 and thus the ballasting is adjusted without pressure because the springs 25 are no longer under tension. When the machine 1 is raised, the ballasting is adjusted as follows:

the user unlocks the locking lever 41 by pulling it toward the interior of the linking structure 7 and pivots it by approximately a quarter turn to immobilize it in the unlocked position; then the user pivots said handle 28 about said first rod 30 by means of the third rod 32, which allows to disengage said second rod 31 from the rack 29, then the user slides the handle 28 over said upper arms 17 to reach the notch corresponding to the required ballasting, and finally the user pivots said handle 28 but this time in the opposite direction so that each end of the second rod 31 engages in said desired notch of each rack 29 and then he locks this position using said locking lever 41.

To pivot the handle 28, the user takes the third rod 32 and pivots it upward about said first rod 30. When the agricultural machine 1 is raised, the springs 25 are no longer being stretched because the working element 5 has reached its low position in which the upper arms 17 have come close to the lower arms 18. Thus the handle 28 can move freely on, even over the upper arms 17. The first rod 30 can then slide over the upper arms 17 between a rear stop 42 and a front stop 43. These two stops 42, 43 advantageously belong to said racks 29. The first rod 30 is easily moved between the two stops 42, 43 since the working element 5 is in the low position, the springs 25 are no longer under tension. The length of the springs 25 is such that the handle 28 is moved freely.

The length of the spring 25 is determined when the upper arm 17 is closest to the lower arm 18, that is to say in the low position. The length of the spring 25 when slack is then substantially equal to the spacing between the lower anchor point 27 and the upper anchor point 26 when the handle 28 is in its last position as shown in FIG. 6. Thus, when the handle 28 is in its first position, as shown in FIG. 2. In this first position the springs 25 are slightly too long, and, in order to prevent the springs 25 from disengaging from said first tube 30, provision is made on one hand for the upper anchor point 26 to be provided with a large loop used to retain each spring 25 in position. Furthermore, the lower anchor point 27 instead comprises a small loop which is intended to be slid around said lower tube 36.

It should be noted that the adjustment of the ballasting is individualized for each working element 5. The ballasting must therefore be modified for each working element 5 mounted on the beam 6, to obtain even work across the full width of the agricultural machine 1. This ballasting adjustment can be easily reproduced for the various working elements 5 comprising the agricultural machine 1 through the use of said rack 29.

On another hand, the ballasting device 24 comprises an adjustment system 44 making it possible to take up the slack of the springs 25 when the handle 28 is placed in its first position. The adjustment system 44 makes it possible to ensure that the upper anchor point 26 is in full contact with the first rod 30. Specifically, the adjustment system 44 is advantageously connected to the lower arms 18. The adjuster system 44 is produced by means of said yokes 37. Each yoke 37 is connected to the corresponding lower arm 18 by means of a bolt 38 and supports said lower tube 36. This lower tube 36 is connected to said yokes 37 in such a way as to be substantially in contact with the low portion of the lower arms 18. The lower tube 36 can thus pivot about the axis of the bolt 38 to take up the slack at the upper anchor point 26. The adjustment system 44 can be immobilized by a shaft passing through the opening 45 made in said yokes 37.

FIGS. 2 and 6 show the handle 28 in the working configuration because the second rod 31 is engaged in the racks 29 and the locking lever 41 is immobilized. The travel of the linking structure 7 is limited vertically by means of at least one stop 46. Such a stop 46 is mounted on either side of the interface 15. It can be seen in the figures that the lower arms 18 are in contact with a respective stop 46. This stop 46 makes it possible to limit the downward movement of the linking structure 7 when the lower arms 18 are in contact with the stop 46. Thus all the figures show the linking structure 7 in the low position. The upward travel is limited by said same stop 46 which comes into contact with the upper arms 17. During work, the upper arms 17 and the lower arms 18 are advantageously in a substantially horizontal position and have a certain freedom of movement until they come into contact with the corresponding stop 46.

During the use of this agricultural machine 1 and in certain working conditions, it is necessary to lighten the working element 5 of part of its weight, that is to say to unballast it. The unballasting has somewhat of a tendency to raise the working element 5 relative to the ground. Such a configuration of the ballasting device 24 is obtained when the springs 25 are preferably inclined toward the front of the machine 1. Thus the upper anchor point 26 is situated in the close vicinity of the beam 6 while the lower anchor point 27 is arranged substantially in the close vicinity of the interface 15 supporting a working element 5. For this configuration, said yokes 37 are advantageously mounted in another opening 47 of the lower arms 18. The unballasting configuration of a working element 5 is not shown in the figures.

Also note that, unlike the ballasting and unballasting operating modes previously described, the ballasting of a working element 5 may also be modified without pivoting said handle 28. It is sufficient to raise said handle 28 to disengage the second rod 31 from the notch and to reengage it in another notch. Naturally the locking handle 41 must be unlocked and locked. By operating in this manner, adapting the ballasting of the working element 5 is more difficult. It is therefore necessary to pull more or less on said springs 25 in order to lengthen them to be able to reengage the second rod 31 in another position of said racks 29.

The element 5; 5A and the machine 1; 1A that have just been described are only an example of embodiment and of use which should in no case limit the field of protection defined by the following claims. Different modifications remain possible, in particular with respect to the constitution of the various working elements 5 or by substituting technical equivalents.

In this way it is perfectly possible for the beam 6 to be a monobar or monobeam beam 6 or for example a beam 6 made of several parts allowing the seed drill to be folded, or even a telescopic beam 6.

The working element 5 described may very easily be replaced by any other apparatus having a working element in contact with the ground such as an equipment for forming furrows. The sowing function is not indispensable for this invention.

It is further possible to mount the working element 5 directly at the end of the upper and lower arms 17, 18 without using an interface 15.

The dimensions (length, diameter) of the various rods 30, 31, 32 described in the present invention are only the representation of an embodiment. They may have a different shape, for example a hexagonal or square section. Likewise said plates 33, 34, 35 may have a different shape from that of a triangle.

What is claimed as new and desired to be secured by Letters Patent of the United States is:

1. A seed drill comprising a frame supported by wheels, said frame including a substantially horizontal beam and a working element mounted on the substantially horizontal beam by a linking structure including an upper arm and a lower arm, said working element is a sowing element being subjected on one hand to a depth control force directed toward the ground and on another hand to a ballasting exerted by a ballasting device including a spring, wherein said ballasting device comprises a handle and a rack, said handle including a first rod resting on said linking structure and a second rod.

2. The seed drill as claimed in claim 1, wherein said spring of said ballasting device is connected to said handle.

3. The seed drill as claimed in claim 1, wherein said spring includes an upper anchor point and a lower anchor point, said upper anchor point being linked to said handle via said first rod.

4. The seed drill as claimed in claim 1, wherein said handle pivots about said first rod to modify the ballasting of the working element.

5. The seed drill as claimed in claim 1, wherein said handle moves above said upper arm.

6. The seed drill as claimed in claim 1, wherein said handle engages in said rack by said second rod.

7. The seed drill as claimed in claim 1, wherein said rack includes an adjustment position.

8. The seed drill as claimed in claim 1, wherein, when the handle is in a first adjustment position, the spring has some slack.

9. The seed drill as claimed in claim 1, wherein said ballasting device includes, in addition, an adjustment system attached to said lower arm.

10. The seed drill as claimed in claim 1, wherein the vertical travel of the linking structure is limited by a stop.

11. The seed drill as claimed in claim 1, wherein said handle includes, in addition, a third rod, said rods being connected by a plate.

12. The seed drill as claimed in claim 1, wherein said handle includes a locking lever making it possible to immobilize the pivoting of said handle about said first rod.

13. A seed drill comprising a frame supported by wheels, said frame including a substantially horizontal beam and a sowing element, sowing element comprising:

a linking structure including an upper arm and a lower arm, said linking structure mounting said sowing element to said substantially horizontal beam; and a ballasting device including a spring connected to one arm of said upper arm and said lower arm, said ballasting device including a handle and a rack connected to another arm of said upper arm and said lower arm, said handle including a first rod resting on said another arm and a second rod configured to be received by said rack.

* * * * *